(12) United States Patent
Shaffer et al.

(10) Patent No.: US 8,164,488 B2
(45) Date of Patent: Apr. 24, 2012

(54) APPARATUS AND METHOD FOR GENERATING A MESSAGE BASED ON TRAFFIC FLOW

(75) Inventors: Shmuel Shaffer, Palo Alto, CA (US); Ramanathan T. Jagadeesan, San Jose, CA (US); Bich Tu Nguyen, Los Altos, CA (US); Gregory D. Pelton, Raleigh, NC (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 368 days.

(21) Appl. No.: 12/017,943

(22) Filed: Jan. 22, 2008

(65) Prior Publication Data

US 2009/0184843 A1    Jul. 23, 2009

(51) Int. Cl.
    *G08B 21/00* (2006.01)
(52) U.S. Cl. ............. 340/995.13; 340/995.1; 340/691.6; 340/7.55; 340/525; 345/1.1; 705/13; 705/14.45
(58) Field of Classification Search ............. 340/995.13, 340/995.1, 691.6, 7.55, 525; 345/1.1; 705/13, 705/14.45
See application file for complete search history.

(56) References Cited

U.S. PATENT DOCUMENTS

| | | | |
|---|---|---|---|
| 5,864,305 A * | 1/1999 | Rosenquist | 340/905 |
| 6,650,948 B1 * | 11/2003 | Atkinson et al. | 700/66 |
| 7,015,875 B2 | 3/2006 | Wampler et al. | 345/2.1 |
| 7,062,469 B2 | 6/2006 | Meyers et al. | 705/64 |
| 7,146,567 B1 | 12/2006 | Duczmal et al. | 715/736 |
| 7,193,583 B2 | 3/2007 | Zerphy et al. | 345/1.3 |
| 7,205,903 B2 | 4/2007 | Blum et al. | 340/815.4 |
| 7,248,229 B2 | 7/2007 | Zerphy et al. | 345/1.3 |
| 7,250,862 B2 | 7/2007 | Bornhoevd et al. | 340/572.1 |
| 7,447,588 B1 * | 11/2008 | Xu et al. | 701/117 |
| 2004/0249566 A1 * | 12/2004 | Jeon | 701/200 |
| 2005/0231394 A1 * | 10/2005 | Machii et al. | 340/995.13 |
| 2006/0082472 A1 * | 4/2006 | Adachi et al. | 340/995.13 |
| 2006/0089870 A1 * | 4/2006 | Myhr | 705/14 |
| 2006/0119535 A1 * | 6/2006 | Van Fossan | 345/1.1 |
| 2006/0229939 A1 * | 10/2006 | Bhakta et al. | 705/14 |
| 2007/0126604 A1 * | 6/2007 | Thacher | 340/995.13 |
| 2007/0159355 A1 * | 7/2007 | Kelly et al. | 340/905 |
| 2007/0257816 A1 * | 11/2007 | Lyle et al. | 340/905 |
| 2008/0068222 A1 * | 3/2008 | MacLeod | 340/995.13 |
| 2008/0088486 A1 * | 4/2008 | Rozum et al. | 340/995.13 |
| 2009/0048769 A1 * | 2/2009 | Xu et al. | 701/118 |

OTHER PUBLICATIONS

Accenture, "Interactive Wall Technology: Seeing the Big Picture" available at: http://www.accenture.com/Global/Services/Accenture_Technology_Labs/Services/SeeingTheBigPicture.htm (2 pages), Jan. 22, 2008.
Accenture, "The Interactive Advertising Wall" available at: http://www.accenture.com/Global/Services/Accenture_Technology_Labs/Services/SeeingTheBigPicture.htm (1 page), Jul. 13, 2007.

* cited by examiner

*Primary Examiner* — Jennifer Mehmood
*Assistant Examiner* — Mark Rushing
(74) *Attorney, Agent, or Firm* — Baker Botts L.L.P.

(57) ABSTRACT

A method includes determining a first flow characteristic of a flow, the flow comprising at least one targeted user. The method also includes generating for display a first message based on the first flow characteristic of the flow.

25 Claims, 2 Drawing Sheets

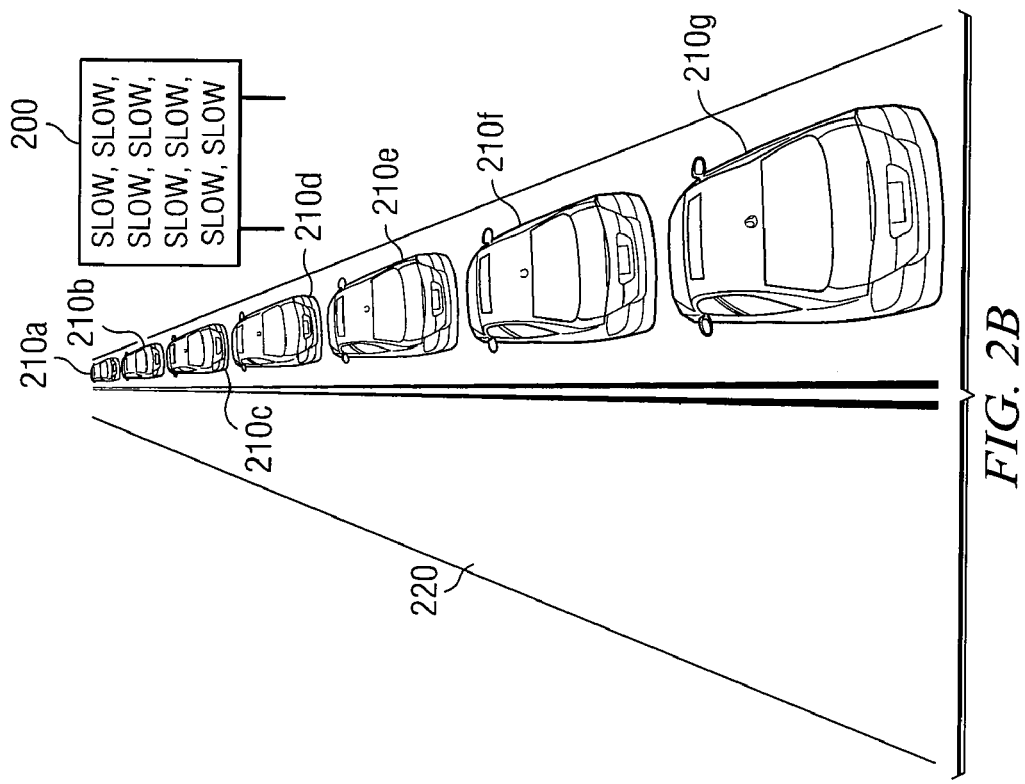
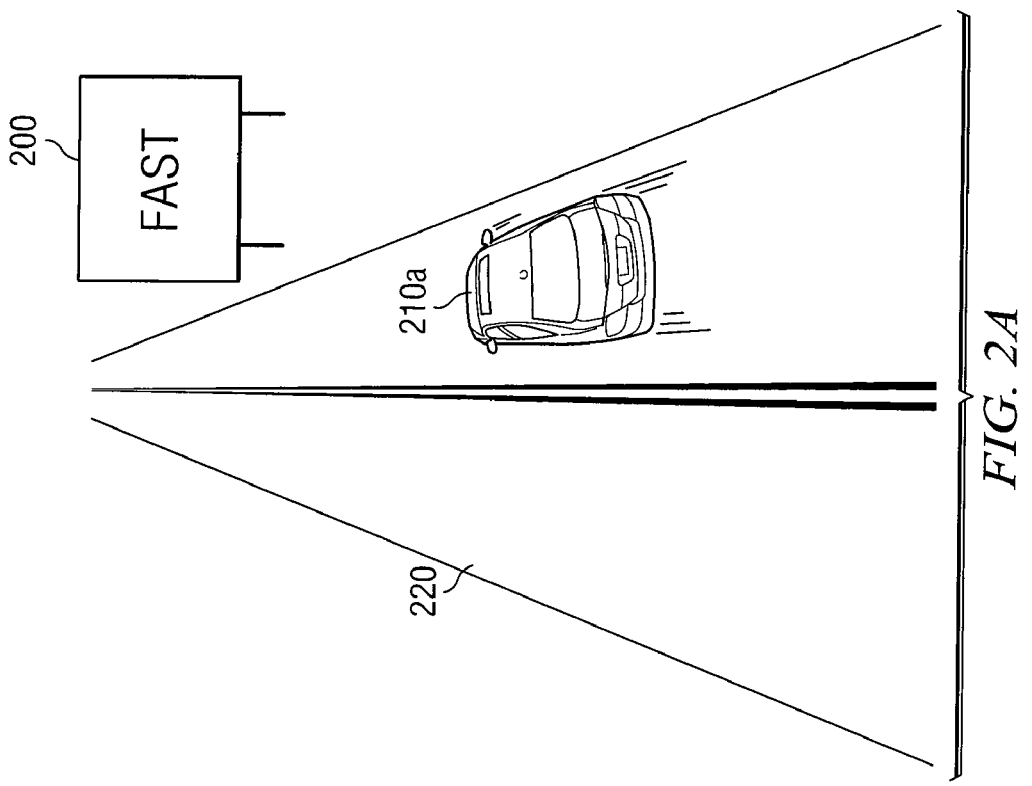

APPARATUS AND METHOD FOR GENERATING A MESSAGE BASED ON TRAFFIC FLOW

TECHNICAL FIELD OF THE INVENTION

This invention relates in general to traffic flow based displays.

BACKGROUND

Advances in display technology have presented advertisers with new ways of conveying their message to the public. Now advertisers are able to create and convey their message using displays that not only are able to display detailed color images, but also animated images and even video clips. Not only have the advances in display technology allowed for more detailed and animated displays they have also allowed for increasingly large displays. Most major league stadiums now include a giant video screens for watching replays and displaying advertisements. The color and resolution of these modern displays thus allows advertisers to present their audience with large amounts of information.

BRIEF DESCRIPTION OF THE DRAWINGS

For a more complete understanding of particular embodiments and their advantages, reference is now made to the following description, taken in conjunction with the accompanying drawings, in which:

FIGS. 2A and 2B depict the same display with two different messages displayed based on a flow characteristic determined from the speed of the targeted user, in accordance with particular embodiments;

DESCRIPTION OF EXAMPLE EMBODIMENTS

Overview

In accordance with particular embodiments, a method includes determining a first flow characteristic of a flow comprising at least one targeted user. The method also includes generating for display a first message based on the first flow characteristic of the flow.

Description

Figure 1:
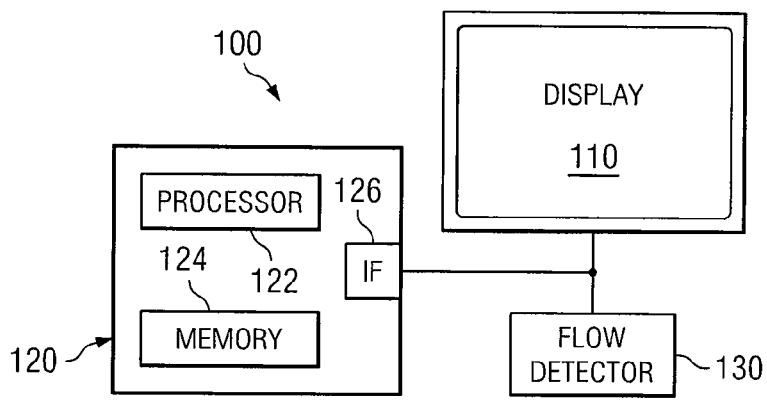
FIG. 1 is a block diagram illustrating components of a traffic flow based message display system, in accordance with particular embodiments.

FIG. 1 is a block diagram illustrating components of a traffic flow based message display system, in accordance with particular embodiments. Traffic flow based message display system 100 includes display 110, message selector 120, and flow detector 130. These components may work together to display flow based messages. For example, in particular embodiments the message that is displayed may be based on a detected flow characteristic of a flow of targeted users. The flow of targeted users may be those users that pass within range of display 110. Thus, the flow of targeted users may be an ever changing collection or stream of users. Accordingly, the flow characteristic may be an indication of how fast the users within the flow are moving, how dense the targeted users are within the flow, or any other characteristic of a flow of targeted users that may be indicative of the amount of time or attention that a targeted user may give to the message displayed on display 110.

Flow detector 130 may be able to determine the flow characteristic, whether based on the density or speed, of users passing within range of display 110. This information may be conveyed to message selector 120. Message selector 120 may then determine the proper message to be displayed by display 110 based on the flow characteristic information provided by flow detector 130. For example, if the users are moving at a relatively high speed then display 110 may display a relatively short message, such as a company or product logo. Alternatively, if the speed is relatively slow then display 110 may use a relatively more detailed message, such as the company or product logo along with a phone number and/or web address. As may be apparent, this may allow advertisers to create a dynamic message that, in effect, changes depending on the amount of time the targeted users likely have to observe the message.

Display 110 may be any type of device able to display messages including static and/or dynamic text, graphics, images, video, or some combination of the above. For example, display 110 may be a large billboard viewed by users driving along a nearby road or a marquee sign in a mall viewed by users walking around the mall. As may be apparent from the wide variance in size in the two previous examples, the technology used to create display 110 may vary depending on the application. More specifically, the technology used in smaller displays may be different than the technology used in larger displays. For example, if display 110 were used in a mall, it may be an LCD or plasma monitor whereas if display 110 were used as a roadside display it may use millions of LEDs. As another example, display 110 may comprise multiple pre-printed messages that are selected based on the detected flow characteristic (e.g., a continuous band with multiple images that is scrolled so that one image is displayed at a time, or several vertical columns with multiple faces that rotate so that each face of the column may display a portion of the message).

The message presented to the target users by display 110 may be determined, in part, by the technology used by display 110. More specifically, the technology used by display 110 may impact the type of information (e.g., static or dynamic) that may be presented. For example, if display 110 uses pre-printed messages (e.g., the continuous band or plurality of columns discussed above) then the information may be static (e.g., a logo, a phone number, an image, text, a web address, or some combination of the above). Then, as the flow characteristics of the flow of targeted users change the static message displayed may change. For example, when the flow rate increases display 110 may switch from a more detailed static image (e.g., a logo with a phone number, web address and some text) to a less detailed static image (e.g., a logo with a web address). Alternatively, if display 110 uses a video display then the information displayed may be dynamic (e.g., short flash messages, movie clips, flash messages with phone numbers and/or URLs, movie clips with phone numbers and/or URLs, or some combination of the above) or static. Then, as the flow characteristics of the flow of targeted users change the static or dynamic message displayed may change. For example, when the flow rate increases display 110 may switch from a dynamic movie clip to a static logo and phone number or a dynamic, but less detailed, flash message.

Regardless of the technology used by display 110, the message that is displayed is received from message selector 120. In particular embodiments the message may be properly formatted specifically for display 110 (e.g., it may be of the proper resolution). In some embodiments the message may be in a standard format and display 110 may perform any necessary formatting. For example, display 110 may be capable of displaying a High-Definition image but message selector 120 may provide display 110 with a Standard-Definition image. Accordingly, display 110 may up-convert the Standard-Definition image to a High-Definition image.

Flow detector 130 may be any type of device able to determine the flow characteristics, whether based on speed or density, of a flow of targeted users. A targeted user may be any user able to see display 110. Thus, the flow may be the continually changing stream of targeted users passing within sight of display 110. Depending on where display 110 is placed, the targeted users may be walking, driving, standing, sitting or engaging in any other activity appropriate for their current location/environment. The following examples may help to illustrate the breadth in technology and technique that may be used to determine the flow characteristic. In some embodiments flow detector 130 may use a radio transmitter and receiver (similar to speed guns used by law enforcement officers to catch speeders) to determine the speed with which users are traveling. In particular embodiments, flow detector 130 may use a video camera and face recognition techniques to determine the density of users. In some embodiments, flow detector 130 may use a radio frequency Identification transmitter/receiver to detect users within range of the RFID transmitter/receiver. In particular embodiments, flow detector 130 may use GPS information to determine the flow characteristic of automobile traffic. Regardless of the technology/technique used to determine the flow characteristic, once flow detector 130 has determined the flow characteristic it may send the information to message selector 120. In some embodiments, flow detector 130 may simply send message selector 120 raw data. For example, flow detector 130 may simply send message selector 120 the speeds detected by the radio transmitter/receiver. In some embodiments, flow detector 130 may send message selector 120 more processed information. For example, flow detector 130 may, instead of sending the speed of each car, on a periodic basis, send information indicative of the average speed (e.g., once a minute generate and send a report detailing the average speed of cars during the last minute).

To receive and process the information generated by flow detector 130 and to determine and generate the message to be displayed by display 110, message selector 120 may include any combination of hardware, software, and/or encoded logic that provides message selection services, such as determining the content and format of a message to be displayed based on a flow characteristic. Message selector 120 has been depicted as including processor 122, memory 124, and interface 126. In other embodiments, message selector 120 may include more, fewer or different components than those depicted in FIG. 1. Furthermore, these components may be within a single device or distributed among several devices.

Processor 122 may be a microprocessor, controller, or any other suitable computing device, resource, or combination of hardware, software and/or encoded logic operable to provide, either alone or in conjunction with other message selector 120 components (e.g., memory 124) message selecting functionality. Such functionality may include providing various features discussed herein to a user. One feature that certain embodiments may provide may include determining the flow characteristic of a user or group of users and, based on the determination, generate an appropriately sized message to be displayed on display 110.

Memory 124 may be any form of volatile or non-volatile memory including, without limitation, magnetic media, optical media, random access memory (RAM), read-only memory (ROM), removable media, or any other suitable local or remote memory component. Memory 124 may store any suitable data or information, including software and encoded logic, utilized by message selector 120. For example, memory 124 may maintain a listing, table, or other organization of information, such as information used to correlate flow characteristics with message size and information for presentation upon display 110. This information may then be used by processor 122 to determine the message that is to be sent to display 110.

Interface 126 may comprise any hardware, software, or encoded logic needed to be able to communicate information to and from display 110 and flow detector 130. Interface 126 may be used to update or add messages stored within memory 124. For example, interface 126 may allow a user to connect a computer to message selector 120 (e.g., through a network, USB, or serial connection) to upload a new message, such as a new advertisement. Interface 126 may generate the message that is to be displayed by display 110 based on the detected flow characteristic.

It may be recognized that display 110, message selector 120, and flow detector 130 disclosed herein are merely example configurations in accordance with particular embodiments. These components may include any number of interfaces, processors, memory modules, and other components to accomplish the functionality and features described herein. While these components have been depicted as coupled to one another, depending on the scenario and configuration, one or more of the components may be integrated together into a single component. For example, message selector 120 may be incorporated into display 110. Although FIG. 1 illustrates a particular number and configuration of components, traffic flow based message display system 100 contemplates any number or arrangement of such components for changing the message displayed based on the detected flow of traffic. For example, traffic flow based message display system 100 may comprise a single message selector 120 coupled to several pairs of flow detector 130 and display 110.

For simplicity, some of the features and functionality of particular embodiments will be explained within the context of the following two scenarios. These scenarios are merely to help illustrate some of the features and functionality of particular embodiments and are not intended to be exhaustive or limiting of other embodiments. Both scenarios include an A figure and a B figure, the differences between the A figure and the B figure highlighting the different messages displayed based on different flow characteristics.

FIGS. 2A and 2B depict the same display with two different messages displayed based on a flow characteristic determined from the speed of the targeted user, in accordance with particular embodiments. For purposes of this scenario, assume that a message selector (e.g., message selector 120) has stored within its memory (e.g. memory 124) a table that correlates a flow characteristic (based on the average measured speed) to a message. Thus, depending on the flow characteristic, the number and physical size of the elements of a message may change. For example, if the average speed is above 65 MPH the message "FAST" is displayed physically large enough to fill the entire display area of display 200, and if the average speed is below 10 MPH the message "SLOW, SLOW, SLOW, SLOW, SLOW, SLOW, SLOW, SLOW" is displayed physically small enough that the entire message fits within the display area of display 200. Further assume that a flow detector (e.g., flow detector 130) using a radio transmitter and receiver pair is able to determine the speed of cars 210

(a targeted user may be within car 210). The flow detector may measure the speed of each car 210 that passes by display 200 and then send the measured speed to the message selector. The message selector may then use this speed information to determine the average speed of cars 210 passing by display 200. This average speed may be used to determine the flow characteristic of the flow of cars (e.g., the targeted audience) and thus the corresponding message. Thus, as can be seen in FIG. 2A, when the average speed of cars 210 is above 65 MPH display 200 displays "FAST" and, as can be seen in FIG. 2B, when the average speed of cars 210 is below 10 MPH display 200 displays "SLOW, SLOW, SLOW, SLOW, SLOW, SLOW, SLOW, SLOW." As may be apparent these messages are merely examples of the types of messages that can be displayed, and how they can be manipulated.

It should be noted that in FIG. 2A the message displayed is relatively short allowing for a large message to be displayed that is quickly read by a target user speeding by within car 210a. For example, if user 210a is moving at a high rate of speed (e.g., over 65 MPH) she will not be able to read a long message or a short message in a small font. Conversely, the message displayed in FIG. 2B is relatively long allowing for the message provider (e.g., an advertiser) to present a target user with more detailed information. For example, if the user is moving a low rate of speed (e.g., less than 10 MPH) she will be able safely spend more time digesting the contents of display 200. This may be particularly desirable during rush hour when cars may be spending a significant amount of time traveling a relatively short distance.

Figure 3A:
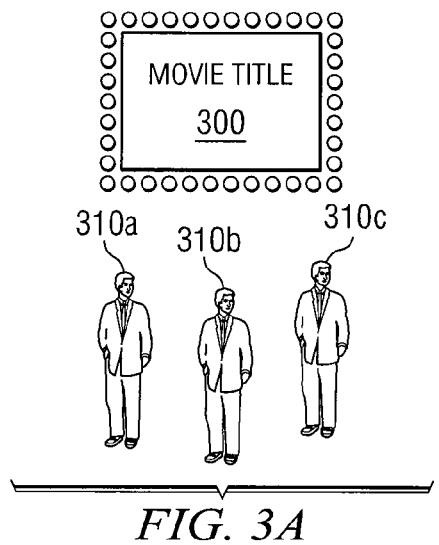
FIGS. 3A and 3B depict the same display with two different messages displayed based on a flow characteristic determined from the density of target users, in accordance with particular embodiments.
Figure 3B:
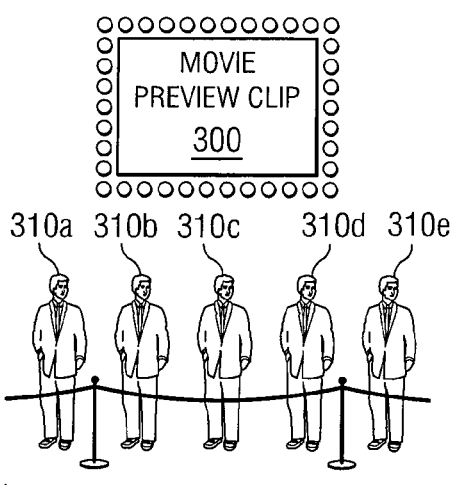

FIGS. 3A and 3B depict the same display with two different messages displayed based on a flow characteristic determined from the density of target users, in accordance with particular embodiments. The density of users may generally correlate to a number of users in a given area. For purposes of this scenario assume that a message selector has stored within its memory a table that correlates the flow characteristic (based on the density of users 310) to a message. For example, if the density of users 310 is less than four users within range of the flow detector then a message containing the title of a movie is displayed on display 300, and if the density of users 310 is more than four users within range of the flow detector then a message containing a trailer for the movie is displayed on display 300. Further assume that the flow detector uses a camera and face recognition techniques to determine the number of users 310 within its range. The flow detector measures the density of target users 310 within its range and sends the measured density to the message selector. The message selector may then use this density information to determine the flow characteristic and the corresponding message. Thus, as can be seen in FIG. 3A, when the density of users is less than four, display 300 displays the title of the movie and, as can be seen in FIG. 3B, when the density of users 310 is above four, display 300 displays the trailer for the movie.

It should be noted that in FIG. 3A the message displayed is a still image allowing for users walking by to be able to observe the whole message without missing anything. For example, if there is a low density of users within range of the flow detector then the users may be busy or moving and thus not in a state conducive to giving display 300 their attention for a prolonged period of time. Conversely, the message displayed in FIG. 3B is a video clip allowing for the message provider (e.g., an advertiser) to present a target user with more detailed information that may take the user a longer amount of time to absorb. For example, if there is a high density of user within range of the flow detector then the users may be in a state that may be conducive to paying attention to display 300 long enough to view a movie trailer. This may be particularly desirable if display 300 was located at a mall where during some of the time users 310 may be there to shop and thus may not wish to stop and watch a movie trailer, but at other times users 310 may be in line for a movie and thus may enjoy watching a movie trailer.

As may be apparent, depending on the placement and/or target market, particular embodiments may combine different features in different ways. For example, in some embodiments the flow detector may be configured to detect the density of users within range of display 300 as well as the average of speed of users. Display 300 may, under normal circumstances, simply display a still image (e.g., the title to a movie) but if the density of users exceeds a predetermined density threshold and the average speed of users drops below a predetermined speed threshold then the display may present the users with a movie trailer. In other words, in some embodiments, the display may only play the movie trailer when the flow detector detects that a crowd of users has stopped in front of the display.

Figure 4:
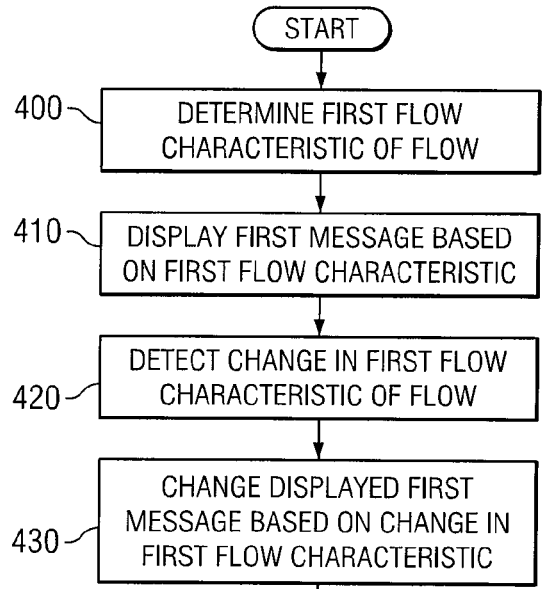
FIG. 4 illustrates a method for displaying an image based on traffic flow, in accordance with particular embodiments.

FIG. 4 illustrates a method for displaying an image based on traffic flow, in accordance with particular embodiments. The method begins with step 400 where a first flow characteristic of the flow is determined. Depending on the type of flow detector that is used by the particular embodiment, the first flow characteristic may be determined by the density or speed of the flow. For example, in some embodiments, an RFID receiver may be used to detect the number of users within proximity of the RFID receiver. Accordingly, the density of the flow may be determined based on the number of users currently detected by the RFID receiver.

At step 410 a first message is displayed based on the first flow characteristic. The first message may, for example, be an advertisement, a warning, or an informative communication. Because different flow characteristics may indicate different levels of user attention, the content of the first message is based on the first flow characteristic. For example, if the first flow characteristic is based on the speed of the flow, then the first message may contain more information the slower the flow is moving. More specifically, the first message may simply be a graphic, image or picture with a short slogan if the first flow characteristic indicates a fast flow; and the first message may contain a more detailed explanation of the benefits of a particular product if the first flow characteristic indicates a slow flow. As may be apparent the change in the first message can vary widely between different embodiments and in different scenarios. For example, the message may vary in the actual content that is presented (e.g., the length and detail of the message), the type of media used (e.g., text, pictures, videos, icons), or the size of the media (e.g, the size of the font or images).

At step 420 a change in the first flow characteristic of the flow is detected. The type of change that is detected may depend on the type of first flow characteristic that is being used. For example, if the first flow characteristic is based on speed, then detecting a change in the first flow characteristic may involve detecting a change in the speed of the flow; similarly if the first flow characteristic is based on density, then detecting a change in the first flow characteristic may involve detecting a change in the density of the flow.

At step 430 the displayed first message is changed based on the change in the first flow characteristic. For example, if the speed of the flow slows down the amount of information present in the first message may increase. As another example, if the density of the flow increases, the first message may change from a static image (e.g., an image similar to a movie poster) to a video image (e.g., a movie trailer). As discussed above, this may take advantage of the likely increase in attention a user may give to the message as they slow down (decrease in speed of the flow) or bunch up (increase in the density of the flow). The size of the change needed to change the first message may vary depending on the needs or goals of the message. For example, a one mile-per-hour change in the speed of the flow may be sufficient to change the message or the message may be changed based on an increase or decrease of ten users within proximity of the flow detector.

Some of the steps illustrated in FIG. 4 may be combined, modified or deleted where appropriate, and additional steps may also be added to the flowchart. Additionally, steps may be performed in any suitable order without departing from the scope of this disclosure.

While various implementations and features are discussed with respect to multiple embodiments, it should be understood that such implementations and features may be combined in various embodiments. For example, features and functionality discussed with respect to a particular figure such as one of FIG. 2 or 3 may be used in connection with features and functionality discussed with respect to another such figure according to operational needs or desires.

Although particular embodiments have been described in detail, it should be understood that various other changes, substitutions, and alterations may be made hereto without departing from the spirit and scope of the appended claims. For example, although certain embodiments have been described with reference to a number of separate elements included within traffic flow based message display system 100, these elements may be combined, rearranged or positioned in order to accommodate particular displaying or messaging needs. In addition, any of these elements may be provided as separate external components to traffic flow based message display system 100 or they may be combined with each other where appropriate. There may be great flexibility in the arrangement of these elements as well as their internal components.

Numerous other changes, substitutions, variations, alterations and modifications may be ascertained by those skilled in the art and it is intended that particular embodiments encompass all, some or none of these changes, substitutions, variations, alterations and modifications as falling within the spirit and scope of the appended claims.

What is claimed is:

1. A method comprising:
    determining at a message selector remote from a display a first flow characteristic of a flow based on information provided by a flow detector proximate to the display, the flow comprising a plurality of users able to view the display that is stationary with respect to the flow, the flow comprising at least one targeted user;
    generating at the message selector remote from the display a first message, the first message comprising a first content related to a subject matter, the first message and the first content based on the first flow characteristic of the flow, the subject matter not indicative of the first flow characteristic of the flow;
    transmitting to the remote display the first message to be displayed on the display that is stationary with respect to the flow and that is viewable by the at least one targeted user;
    detecting a change in the first flow characteristic of the flow; and
    changing at the message selector the first content of the displayed first message to a second content of the displayed first message, the second content based on the detected change in the first flow characteristic of the flow and related to the same subject matter as the first content.

2. The method of claim 1, wherein changing the first content of the displayed first message to a second content of the displayed first message comprises changing an amount of information displayed by the display based on the detected change in the first flow characteristic of the flow.

3. The method of claim 1, wherein changing the first content of the displayed first message to a second content of the displayed first message comprises changing the number and physical size of at least one element of the first message based on the detected change in the first flow characteristic of the flow.

4. The method of claim 1, wherein:
    changing the first content of the displayed first message to a second content of the displayed first message, the second content based on the detected change in the first flow characteristic of the flow comprises changing a media format of the first message without changing the subject matter of the content, the change in the displayed first message based on the detected change in the first flow characteristic of the flow.

5. The method of claim 1, wherein changing the first content of the displayed first message to a second content of the displayed first message comprises changing the type of information displayed by the first message based on the detected change in the first flow characteristic of the flow.

6. The method of claim 1, wherein:
    determining a first flow characteristic of a flow comprising at least one targeted user comprises determining the first flow characteristic of a flow comprising at least one targeted user in a motor vehicle; and
    generating at the message selector remote from the display a first message, the first message comprising a first content related to a subject matter, the first message and the first content based on the first flow characteristic of the flow comprising at least one targeted user comprises generating at the message selector remote from the display a first message, the first message comprising a first content related to a subject matter, the first message and the first content based on the first flow characteristic of the flow comprising the at least one targeted user in the motor vehicle.

7. The method of claim 1, wherein:
    determining a first flow characteristic of a flow comprising at least one targeted user comprises determining the first flow characteristic of a flow comprising at least one targeted user in a line; and
    generating at the message selector remote from the display a first message, the first message comprising a first content related to a subject matter, the first message and the first content based on the first flow characteristic of the flow comprising at least one targeted user comprises generating at the message selector remote from the display a first message, the first message comprising a first content related to a subject matter, the first message and the first content based on the first flow characteristic of the at least one targeted user in the line.

8. The method of claim 1, wherein:
    determining the first flow characteristic of a flow comprises determining a speed of the flow; and
    generating at the message selector remote from the display a first message, the first message comprising a first content related to a subject matter, the first message and the first content based on the first flow characteristic of the flow comprises generating at the message selector remote from the display a first message, the first message comprising a first content related to a subject matter, the first message and the first content based on the speed of the flow.

9. The method of claim 1, wherein:
determining the first flow characteristic of the flow comprises determining a user density of the flow; and
generating at the message selector remote from the display a first message, the first message comprising a first content related to a subject matter, the first message and the first content based on the first flow characteristic of the flow comprises generating at the message selector remote from the display a first message, the first message comprising a first content related to a subject matter, the first message and the first content based on the user density of the flow.

10. The method of claim 1, wherein generating at the message selector remote from the display a first message, the first message comprising a first content related to a subject matter, the first message and the first content based on the first flow characteristic of the flow comprises generating at the message selector remote from the display a first message, the first message comprising a first content related to a subject matter, wherein the first message and the first content comprise more information the greater the amount of time the first user is able to view the first message, the amount of time the first user is able to view the first message is based on the first flow characteristic of the flow.

11. The method of claim 1, wherein changing at the message selector the first content of the displayed first message to a second content of the displayed first message comprises changing the first message from a still image to an animated image based on the detected change in the first flow characteristic, the still image and the animated image related to the same subject matter as the first content.

12. An apparatus comprising:
a processor operable to:
determine a first flow characteristic of a flow, the flow comprising a plurality of users comprising at least one targeted user; and
generate for display a first message comprising a first content related to a subject matter, the first message and the first content based on the first flow characteristic of the flow, the subject matter not indicative of the first flow characteristic of the flow; and
an interface coupled to the processor and operable to transmit the first message to a display device that is stationary with respect to the plurality of users and that is viewable by the at least one targeted user;
wherein the processor is further operable to:
detect a change in the first flow characteristic of the flow; and
change the first content of the displayed first message to a second content of the displayed first message, the second content based on the detected change in the first flow characteristic of the flow and related to the same subject matter as the first content.

13. The apparatus of claim 12, wherein the processor operable to:
change the first content of the first message for display to a second content of the first message is further operable to change an amount of information displayed by the display based on the detected change in the first flow characteristic of the flow.

14. The apparatus of claim 12, wherein the processor operable to change the first content of the first message for display to a second content of the first message comprises a processor operable to change the number and physical size of at least one element of the first message based on the detected change in the first flow characteristic of the flow.

15. The apparatus of claim 12, wherein:
change the first content of the first message for display to a second content of the displayed first message, the second content based on the detected change in the first flow characteristic of the flow comprises a processor operable to change a media format of the first message for display without changing the subject matter of the first message for display, the change in the displayed first message based on the detected change in the first flow characteristic of the flow.

16. The apparatus of claim 12, wherein the processor operable to change the first content of the first message for display to a second content of the first message for display comprises a processor operable to change the first message for display based on the detected change in the first flow characteristic of the flow.

17. The apparatus of claim 12, wherein:
the processor operable to determine a first flow characteristic of a flow comprising at least one targeted user comprises a processor operable to determine the first flow characteristic of a flow comprising at least one targeted user in a motor vehicle; and
the processor operable to generate for display a first message comprising a first content related to a subject matter, the first message and the first content based on the first flow characteristic of the flow comprising at least one targeted user comprises a processor operable to generate for display a first message comprising a first content related to a subject matter, the first message and the first content based on the first flow characteristic of the flow comprising the at least one targeted user in the motor vehicle.

18. The apparatus of claim 12, wherein:
the processor operable to determine a first flow characteristic of a flow comprising at least one targeted user comprises a processor operable to determine a first flow characteristic of a flow comprising at least one targeted user in a line; and
the processor operable to generate for display a first message comprising a first content related to a subject matter, the first message and the first content based on the first flow characteristic of the at least one targeted user comprises a processor operable to generate for display a first message comprising a first content related to a subject matter, the first message and the first content based on the first flow characteristic of the at least one targeted user in the line.

19. The apparatus of claim 12, wherein:
the processor operable to determine the first flow characteristic of a flow comprises a processor operable to determine a speed of the flow; and
the processor operable to generate for display a first message comprising a first content related to a subject matter, the first message and the first content based on the first flow characteristic of the flow comprises a processor operable to generate for display a first message comprising a first content related to a subject matter, the first message and the first content based on the speed of the flow.

20. The apparatus of claim 12, wherein:
the processor operable to determine the first flow characteristic of the flow comprises a processor operable to determine a user density of the flow; and
the processor operable to generate for display a first message comprising a first content related to a subject matter, the first message and the first content based on the first flow characteristic of the flow comprises a processor operable to generate for display a first message comprising a first content related to a subject matter, the first message and the first content based on the user density of the flow.

21. The apparatus of claim 12, wherein the processor operable to generate at the message selector remote from the display a first message, the first message comprising a first content related to a subject matter, the first message and the first content based on the first flow characteristic of the flow comprises a processor operable to generate at the message selector remote from the display a first message, the first message comprising a first content related to a subject matter, wherein the first message and the first content comprise more information the greater the amount of time the first user is able to view the first message, the amount of time the first user is able to view the first message is based on the first flow characteristic of the flow of targeted users.

22. An apparatus comprising:
means for determining at a message selector remote from a display a first flow characteristic of a flow based on information provided by a flow detector proximate to the display, the flow comprising a plurality of users comprising at least one targeted user;
means for generating at the message selector remote from the display a first message, the first message comprising a first content related to a subject matter, the first message and the first content based on the first flow characteristic of the flow, the subject matter not indicative of the first flow characteristic of the flow;
means for transmitting to the display the first message to be displayed on the display that is stationary with respect to the plurality of users and that is viewable by the at least one targeted user;
means for detecting a change in the first flow characteristic of the flow; and
means for changing at the message selector the first content of the displayed first message to a second content of the displayed first message, the second content based on the detected change in the first flow characteristic of the flow and related to the same subject matter as the first content.

23. A method comprising:
determining a first flow characteristic of a flow, the flow comprising at least one targeted user able to view the display that is stationary with respect to the flow;
generating, based on the first flow characteristic, an advertisement to be displayed on a display, the advertisement comprising a first message advertising a product and not indicative of the first flow characteristic of the flow, the first message and the product based on the first flow characteristic and not indicative of the first flow characteristic;
displaying the first message on a display that is viewable by the at least one targeted user within the flow;
detecting a change in the first flow characteristic of the flow; and
changing the displayed first message of the advertisement to a second message, the second message based on the detected change in the first flow characteristic of the flow, the second message advertising the same product advertised in the first message.

24. A method comprising:
determining at a message selector remote from a stationary display a flow characteristic indicative of a density of a flow comprising a plurality of users based on information provided by a flow detector proximate to the stationary display;
selecting at the message selector remote from the stationary display a first message to be displayed on the stationary display that is viewable by the flow of users, the first message comprising a first content related to a subject matter, the message and the first content selected based on the density of the flow, the subject matter not indicative of the density of the flow;
transmitting to the stationary display remote from the message selector the first message to be displayed on the stationary display;
detecting a change in the density of the flow; and
changing at the message selector the first content of the displayed first message to a second content of the displayed first message, the second content based on the detected change in the density of the flow and related to the same subject matter as the first content.

25. A method comprising:
detecting, at a first time, a first rate of travel of at least a first user of a flow of users, the flow of users comprising a plurality of users passing within a first range of a remote stationary display;
determining a first flow characteristic indicative of a first range of speeds associated with the flow of users, the first flow characteristic determined based on the rate of travel of the first user within the flow of users;
generating for display to the flow of users a first message, the first message comprising a first level of detail related to a subject matter, the first message and the first level of detail based on the first flow characteristic;
transmitting the first message to the remote stationary display to be displayed on the remote stationary display, the remote stationary display viewable by the flow of users as the flow of users passes by the remote stationary display;
detecting, at a second time, a second rate of travel of at least a second user within the flow of users;
determining a second flow characteristic indicative of a second range of speeds associated with the flow of users, the second flow characteristic determined based on the second rate of travel of the second user within the flow of users;
generating for display to the flow of users a second message based on the second flow characteristic, the second message comprising a second level of detail different than the first level of detail and related to the same subject matter as the first message, the second level of detail based on the first flow characteristic; and
transmitting the second message to the remote stationary display to be displayed on the remote stationary display.

* * * * *